(12) United States Patent
Prenn et al.

(10) Patent No.: US 9,171,239 B2
(45) Date of Patent: Oct. 27, 2015

(54) PROCESSING IMAGE DATA STRIPS IN COLUMNAR REGIONS

(75) Inventors: Mary T Prenn, Star, ID (US); Richard W Hernandez, Boise, ID (US); John Harris, Boise, ID (US); Bradley R Larson, Meridian, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 18 days.

(21) Appl. No.: 14/126,452

(22) PCT Filed: Jun. 22, 2011

(86) PCT No.: PCT/US2011/041425
§ 371 (c)(1),
(2), (4) Date: Dec. 16, 2013

(87) PCT Pub. No.: WO2012/177248
PCT Pub. Date: Dec. 27, 2012

(65) Prior Publication Data
US 2014/0118759 A1    May 1, 2014

(51) Int. Cl.
*H04N 1/60* (2006.01)
*G03F 3/08* (2006.01)
*G06K 9/00* (2006.01)
*G06K 15/02* (2006.01)
*H04N 1/387* (2006.01)
*H04N 1/40* (2006.01)
*H04N 1/401* (2006.01)

(52) U.S. Cl.
CPC .......... *G06K 15/1898* (2013.01); *H04N 1/3876* (2013.01); *H04N 1/4015* (2013.01); *H04N 1/40068* (2013.01)

(58) Field of Classification Search
None
See application file for complete search history.

(56) References Cited

U.S. PATENT DOCUMENTS

| 5,463,720 | A  | * | 10/1995 | Granger ............................. 358/1.9 |
| 5,949,964 | A  | * | 9/1999  | Clouthier et al. ............. 358/3.06 |
| 6,049,390 | A  | * | 4/2000  | Notredame et al. .......... 358/1.15 |
| 7,407,261 | B2 |   | 8/2008  | Silverbrook |
| 7,573,603 | B2 |   | 8/2009  | Pattusamy et al. |
| 7,826,677 | B2 |   | 11/2010 | Tsai |
| 7,839,424 | B1 |   | 11/2010 | Clark et al. |
| 2003/0142154 | A1 |  | 7/2003 | Furimori |
| 2004/0202383 | A1 | * | 10/2004 | Larson et al. .................. 382/303 |
| 2005/0180648 | A1 | * | 8/2005 | Curry et al. .................... 382/243 |
| 2006/0067592 | A1 | * | 3/2006 | Walmsley et al. ............ 382/303 |
| 2006/0103689 | A1 |  | 5/2006 | Vinas et al. |
| 2006/0120787 | A1 | * | 6/2006 | Abello ............................. 400/76 |
| 2006/0139681 | A1 | * | 6/2006 | Walmsley ..................... 358/1.14 |
| 2007/0216920 | A1 |  | 9/2007 | Watanabe |

FOREIGN PATENT DOCUMENTS

| CN | 1741566 | 3/2006 |
| CN | 1766744 | 5/2006 |
| EP | 0730249 | 9/1996 |

OTHER PUBLICATIONS

International Searching Authority, The International Search Report and the Written Opinion, Feb. 9, 2012, 9 Pages.

* cited by examiner

*Primary Examiner* — Madelein Nguyen
(74) *Attorney, Agent, or Firm* — Law Office of Robert C. Sismilich (57) ABSTRACT

An apparatus and methods for processing image data in which an image pipeline serially processes columnar regions of a multi-row strip of the image data.

20 Claims, 10 Drawing Sheets

PROCESSING IMAGE DATA STRIPS IN COLUMNAR REGIONS

BACKGROUND

Printers, both black-and-white and color, are widely used in businesses and in homes. Such printers include laser printers, inkjet printers, and other printing technologies. In addition to stand-alone printers, printers are also widely incorporated into other products that utilize a printing subsystem, such as copiers, facsimile machines, and multifunction devices (e.g. a combination of at least two of a printer, scanner, copier, and fax), to name a few. In general, printers receive image data, and convert the image data into print data that is used to print the image on a print medium.

DETAILED DESCRIPTION

As noted in the Background section, printers are widely used in a variety of products and applications. Many users desire that these products, for a given level of performance and quality, have a low cost. Many users also desire to print on different size print media at different times. For example, at one time the user may wish to print on smaller A4 size media, while at other times print on larger A3 size media. Similarly, users may wish to print at different print resolutions at different times; for example, at a resolution of 300 dots-per-inch (dpi) at one time, and at 1200 dpi at another time.

The print media may be any type of suitable sheet or roll material, such as paper, card stock, cloth or other fabric, transparencies, Mylar, and the like, but for convenience the illustrated embodiments are described using paper as the print medium.

A printer is designed to meet the most demanding requirements that it supports. In the example above, the printer would be designed to print on A3 media at 1200 dpi, but could also be used with A4 media and at 300 dpi. More stringent requirements increase the cost of a variety of components of the printer. For example, many printers process the data for an image to be printed in a series of image-wide strips. Processing and storing data for an A3-wide, 1200 dpi image strip uses components having more logic and memory than would an A4-wide, 300 dpi image. One such component may be an application-specific integrated circuit (ASIC) which implements an image pipeline for converting the image data into print data for a print engine. In one situation, these components are designed for the most stringent requirements, and these costs are passed on to all purchasers, even those with less stringent printing requirements. Alternatively, different components are designed for each set of printing requirements, but this adds complexity and cost to many aspects of a manufacturer's operations. Furthermore, if a new requirement comes along—for example, printing an A3-wide strip at 2400 dpi—the existing components would likely be unable to accommodate it.

Referring now to the drawings, there is illustrated an example of a printer and printing methods which process columnar regions of an image data strip in serial fashion. The printer includes an image pipeline that is dynamically reprogrammed to process each region of the strip. The number of columnar regions to be processed for a strip is configured based on the media size, the print resolution, and a predetermined width of the columnar regions. By varying the number of columnar regions to be processed for a strip, different combinations of media size and print resolution can be accommodated by the ASIC. This width may be judiciously selected to advantageously lower the cost of the printer by reducing the amount of memory and logic internal and external to the ASIC, with little or no decrease in image processing throughput. The same ASIC can be used in a variety of printers having a range of different media size and print resolution requirements. In addition, by increasing the number of columnar regions in a strip, the ASIC can be used to print on newer and larger media sizes, and at newer and increased printing resolutions.

Figure 1:
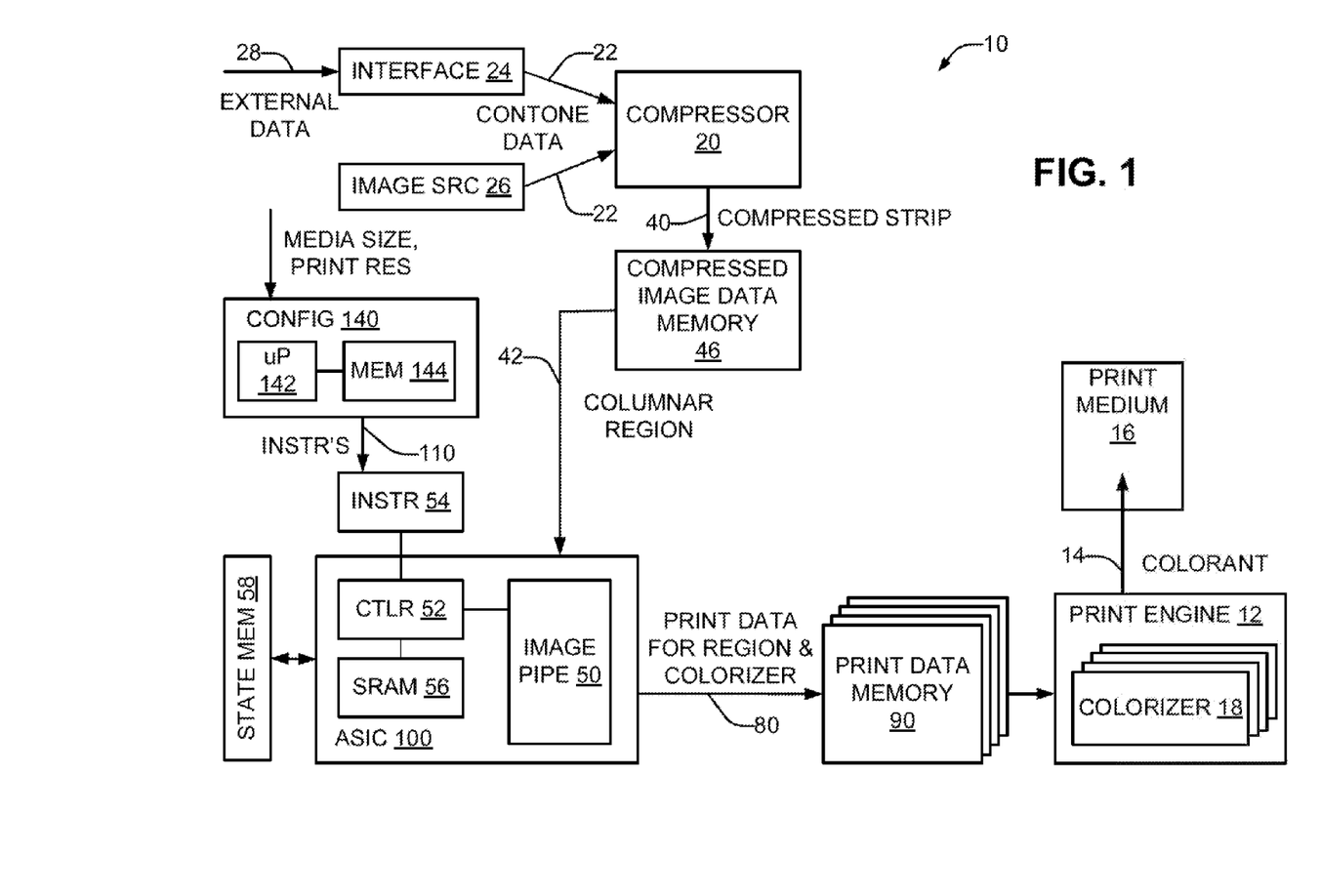
FIG. 1 is a block diagram representation of a printer according to an embodiment of the present disclosure.

As best understood with reference to FIG. 1, one example of a printer 10 has a print engine 12 for depositing at least one colorant 14 on a print medium 16. As defined herein and in the appended claims, a "colorant" shall be broadly understood to mean a substance of a particular color deposited onto a print medium to form at least a portion of a printed image. The print engine 12 has at least one colorizer 18. As defined herein and in the appended claims, a "colorizer" shall be broadly understood to mean a print engine subsystem that directly or indirectly deposits a particular colorant onto a print medium. For example, engine 12 may have four colorizers 18, each colorizer 18 configured to deposit a different one of cyan (C), magenta (M), yellow (Y), and black (K) colorant. Such colorants are one example of a colorant set that enables a color image to be printed on the print medium 16. In other examples, instead of a single print engine 12 with multiple colorizers 18, there may be a multiple print engines 12 each with one or more colorizers 18.

The printer 10 includes a compressor 20. The compressor 20 is configured to convert continuous-tone (contone) image data 22 in a row-and-column format into compressed multi-row strips 40 of pixels. As defined herein and in the appended claims, "contone image data" shall be broadly understood to mean a two-dimensional arrangement of pixels that collectively represent an image, wherein the pixels have a sufficient range of values such that the image presents a substantially continuous tone to a viewer. The contone image data may be grayscale or color. The contone image data is typically represented in a color space. One example color space is RGB, in which each pixel has a red value, a green value, and a blue value that collectively define the color of the pixel in a three-dimensional color space. An RGB color space is considered to be "device-independent" in that the individual R, G, and B values do not correspond to any particular image rendering device. For example, these values do not correspond to the C, M, Y, and K values for the colorizers 18 of the printer 10.

The contone image data 22 may be external data 28 received from a source external to the printer 10, such as a computer for example, via interface 24. In some examples, high level image data, such as data in a page description language (PDL), may be sent to the printer 10, and the printer 10 processes the PDL data to generate the contone image data 22. The contone image data 22 may alternatively or in addition be received from an image source 26 internal to the printer 10 via interface 24. The image source, for example, may be an optical scanner that is included in a copier or a multifunction printing device, for example. Different formats of contone data 22 may be input to the compressor 20, and the compressor 20 may be configured to compress a variety of different contone data formats.

Figure 2:
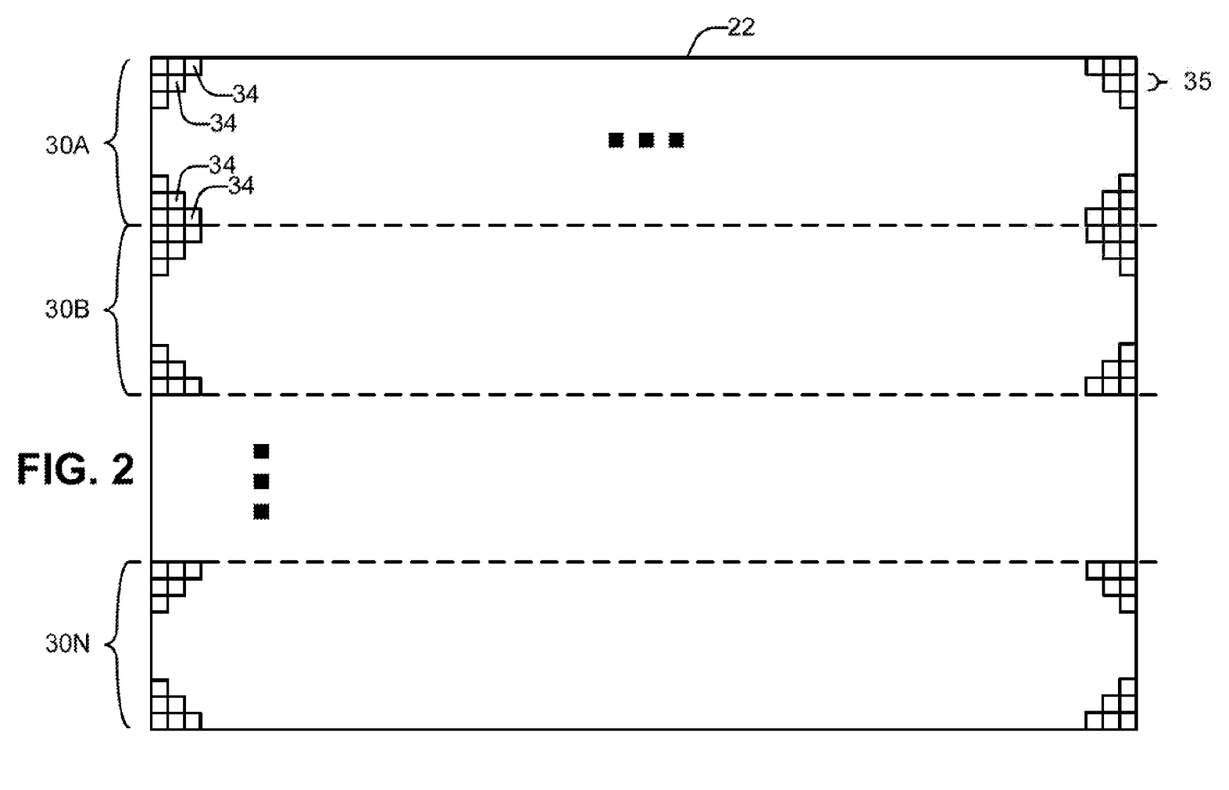
FIG. 2 is a schematic representation of contone image data printable using the printer of FIG. 1 in accordance with an embodiment of the present disclosure.

Considering now in further detail the contone image data 22, and with further reference to FIG. 2, the data 22 is arranged in a row-and-column format array of individual pixels 34. For clarity, a small number of such pixels 34 are illustrated, although it is understood that such pixels exist throughout the data 22 in a two-dimensional row-and-column arrangement. For example, row 35 is one such row of pixels 34. For data compression performed by the compressor 20, image data 22 can be divided into N uncompressed multi-row strips 30, such as the strips denoted 30A through 30N. Each strip 30 encompasses all the pixels 34 of a number of rows. In some examples, a strip 30 may encompass all the pixels 34 of 64 or 128 rows.

Figure 3:
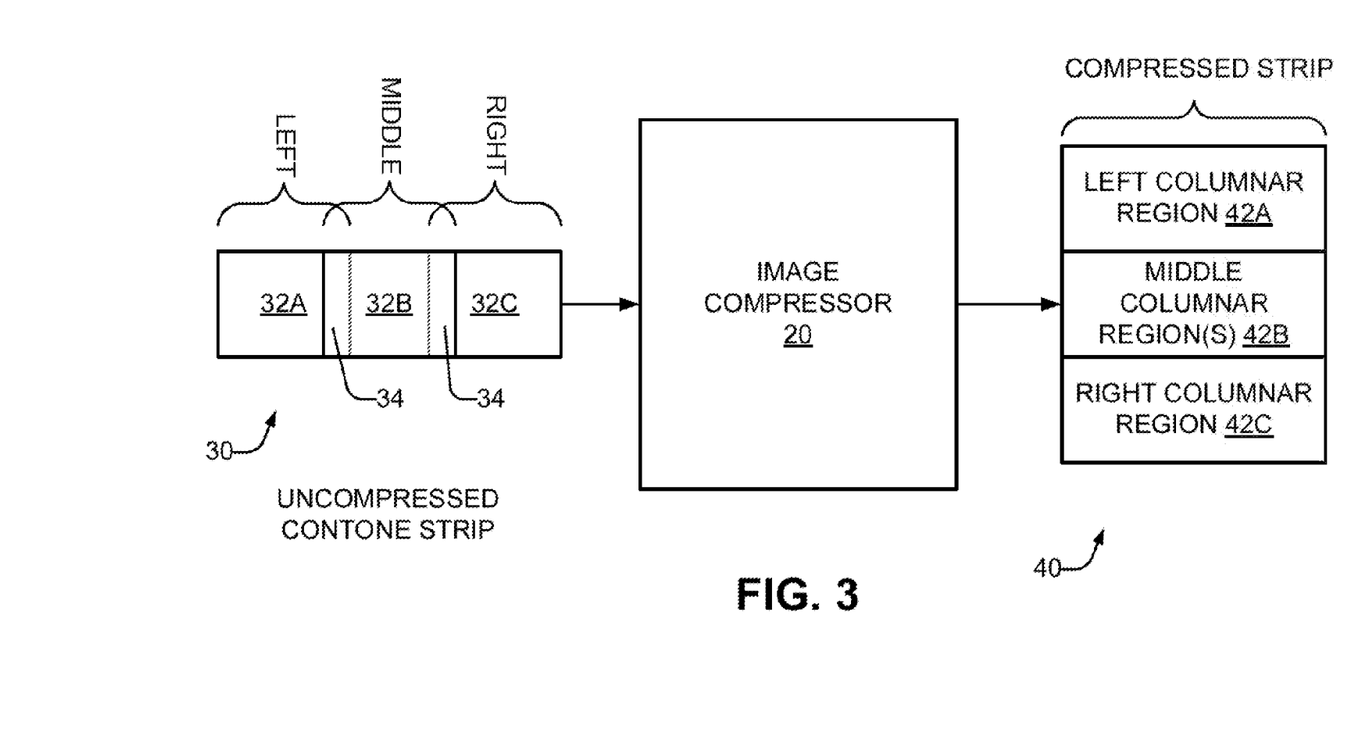
FIG. 3 is a schematic representation of an image compressor of the printer of FIG. 1 and its operation in accordance with an embodiment of the present disclosure.

Considering now in further detail the operation of the compressor 20, and with further reference to FIG. 3, the compressor 20 divides an uncompressed strip 30 into a plurality of overlapping multi-column columnar regions 32 for compressing. Each region 32 includes a plurality of columns of individual pixels 34. FIG. 3 illustrates left 32A, middle 32B, and right 32C overlapping columnar regions of strip 32, having boundaries indicated by braces ("{"). Middle region 32B represents zero to N middle regions; some example strips 30 have left and right columnar regions 32A, 32C with zero middle regions 32B, while other example strips 30 have multiple middle regions 32B. The pixels 34 in overlap areas 36 are included in the two overlapping regions 32, which will be discussed subsequently in greater detail with reference to FIG. 5.

After an overlapping columnar region 32 of the uncompressed strip 32 has been identified, the compressor 20 converts the columnar region 32 into a compressed overlapping columnar region 42 of a compressed multi-row strip 40. The compressor 20 may utilize one or more of a variety of different compression techniques such as, for example, JPEG, JPEG 2000, and LZW, among a variety of others. In some examples, a compressed columnar region 42 may contain a single plane in which the compressed R, G, and B values of the pixels are interleaved. In other examples, a compressed columnar region 42 may contain separate planes for the R, G, and B pixel values.

With further reference to FIG. 1, the compressed strip 40 may be stored in a compressed image data memory 46. In some situations, a number of compressed strips 40 may be stored in the memory 46 before downstream processing of the compressed strips 40 begins. For example, a number of compressed strips 40 corresponding to a full page image to be printed may be stored before downstream processing begins.

The printer 10 includes an image pipeline 50 that is configured to serially process each compressed columnar region 42 of a selected one of the compressed strips 40 so as to generate print data 80 that corresponds to the columnar region 42 for a selected one of the colorizers 18, and store the print data 80 in a print data memory 90.

Figure 4:
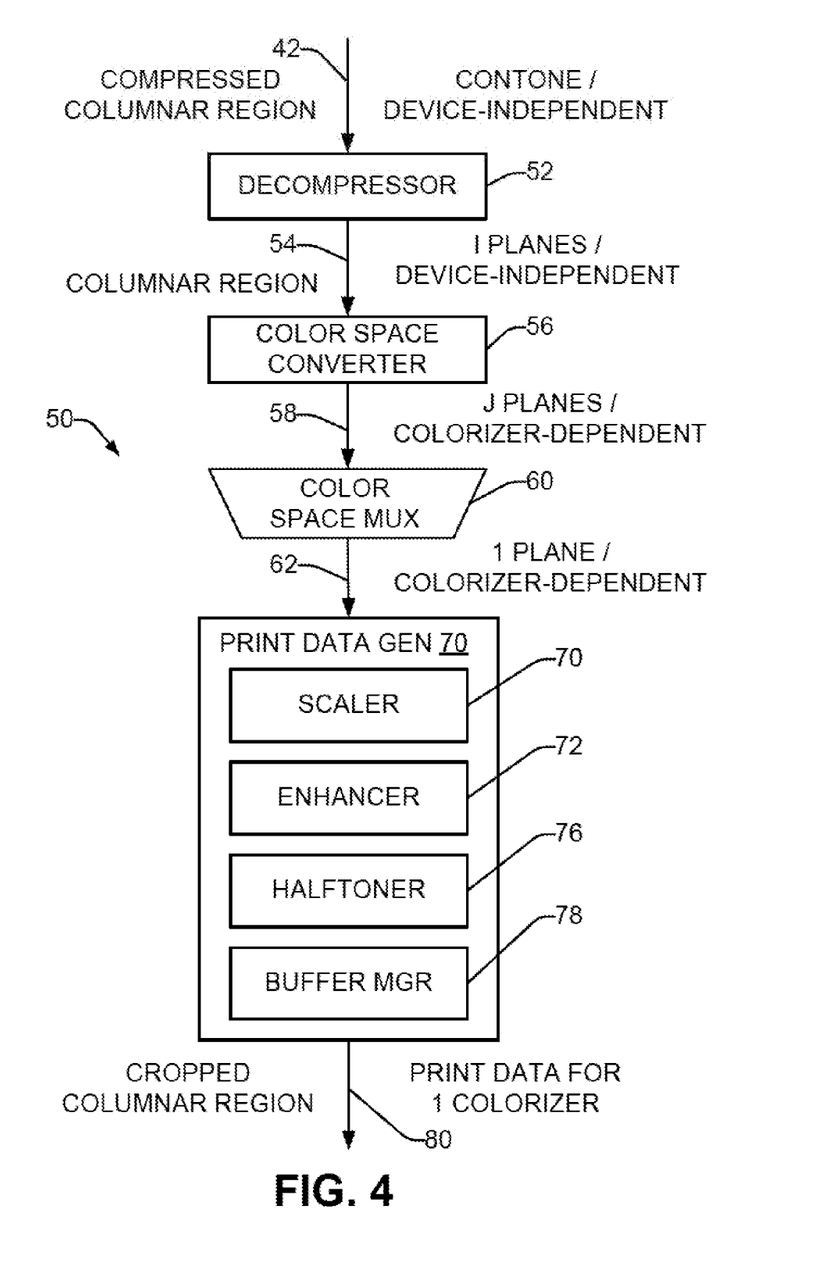
FIG. 4 is a block diagram representation of an image pipeline of the printer of FIG. 1 in accordance with an embodiment of the present disclosure.

Considering now in further detail the image pipeline 50, and with further reference to FIG. 4, the pipeline has a number of stages that process a compressed overlapping columnar region 42. As defined herein and in the appended claims, a "pipeline" shall be broadly understood to mean an element in which stages thereof execute (in hardware, software, or a combination of both) substantially in parallel on different transformations of data which are serially forwarded through the pipeline from stage to stage. A compressed columnar region 42 enters a decompressor stage 52 that decompresses the region 42 to generate decompressed device-independent contone data 54 for the overlapping columnar region. In some examples, the device-independent data 54 is organized into a number I of planes. For example, where the device-independent data 54 is organized in this manner, there may be three separate planes of R, G, and B values of the pixels 34 in the device-independent data 54. The device-independent data 54 then enters a color space converter stage 56 that converts the data 54 into a number J of planes of colorizer-dependent data 58 for the columnar region. For example, this may be four separate planes of C, M, Y, and K values of the pixels 34 in the decompressed columnar region data 54. The J planes of colorizer-dependent data 58 is provided to a color space multiplexor 60. The multiplexor 60 selects one of the J planes for processing by a print generator stage 70. From the pixels of the selected plane of colorizer-dependent data 58, the print generator stage 70 generates corresponding pixels of print data 80 for that particular colorizer 18 which corresponds to the selected one of the J planes. Typically, the print data 80 has control signals for the colorizer 18 that will cause the colorizer 18, when the control signals are applied, to deposit on the print medium 16 the appropriate amounts of that colorant 14 that correspond to the values of the various pixels of the image. As will be discussed subsequently in greater detail with reference to FIG. 5, the print data 80 corresponds to the pixels 34 of a cropped portion of an uncompressed columnar region 32.

The print generator stage 70 may include a number of sub-stages. A scaler sub-stage 72 can scale the selected plane of colorizer-dependent data 58 in the row and/or column directions. For example, the scaler 72 can convert 300 dpi data into 600 dpi data by performing a 2× scaling operation, or into 1200 dpi data by performing a 4× scaling operation. Other amounts of scaling may be performed in some examples, including a different amount of scaling in the row direction from the column direction. An enhancer sub-stage 74 can process the colorizer-dependent data 58 to improve the quality of the image as printed. A halftoner sub-stage 76 halftones the data to a resolution consistent with print data for the colorizer 18, and may further improve the quality of the image that will be produced by the print data. A buffer manager sub-stage 78 finalizes the formatting of the print data 80 and stores it in a print data memory 90 (FIG. 1).

Figure 5:
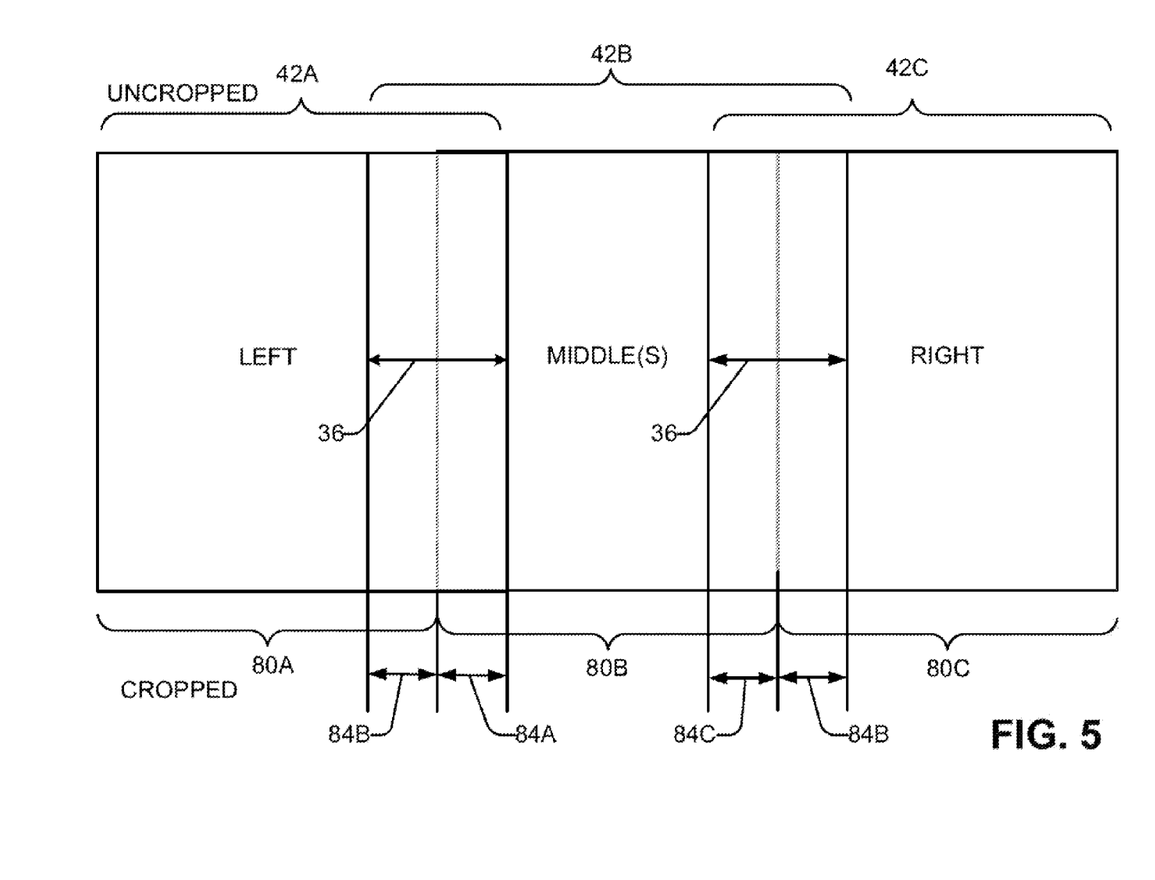
FIG. 5 is a schematic representation of the processing of overlapping columnar regions of a strip of image data to form cropped columnar regions of print data using the printer of FIG. 1 in accordance with an embodiment of the present disclosure.

Considering now the print data 80 in greater detail, and with reference to FIG. 5, as discussed heretofore the image pipeline 50 processes overlapping columnar regions 42 of contone data and generates cropped columnar regions 80 of print data for a particular colorizer 18. The buffer manager sub-stage 78 of the image pipeline 50 performs the cropping operations that eliminate the overlap. For example, overlapping columnar regions 42A-C are processed to generate cropped columnar regions 80A-C respectively. The columnar regions 42A-C are defined to include the overlap 36 because various operations performed by the print data generator 70, such as for example those performed by the enhancer 74 and/or the halftoner 76, may be performed on a sliding window of data through which the print data value of one pixel may be determined at least in part by the values of its neighboring pixels. Since each overlapped columnar region 42 is processed serially by the image pipeline 50 to generate corresponding cropped columnar region 80, the overlap 36 is of sufficient width to include those data pixels of adjacent columnar regions 42 that affect the print data 80 for the columnar region 42 being processed. Left 42A and right 42C overlapped columnar regions have one area of overlap, while middle overlapped columnar region(s) 42B have two areas of overlap.

Left cropped column 80A is generated by cropping area 84A from the print data. Middle cropped column(s) 80B are generated by cropping two areas 84B from the print data. Right cropped column 80C is generated by cropping area 84C from the print data. The resulting width of a cropped columnar region of print data 80 is the width of the overlapped columnar region 42 minus the corresponding cropped area(s) 84.

In some examples, all overlapped columnar regions 42A-C processed through the pipeline may have the same width. In this case, the resulting middle cropped columnar regions 80B will be narrower than left 80A and right 80C cropped columnar regions. In other examples, the cropped columnar regions 80A-C output by the image pipeline 50 may all have the same width. In this case, middle overlapped columnar regions 42B will be wider than left 42A and right 42C overlapped columnar regions. Other variations in width are also possible.

Figure 6:
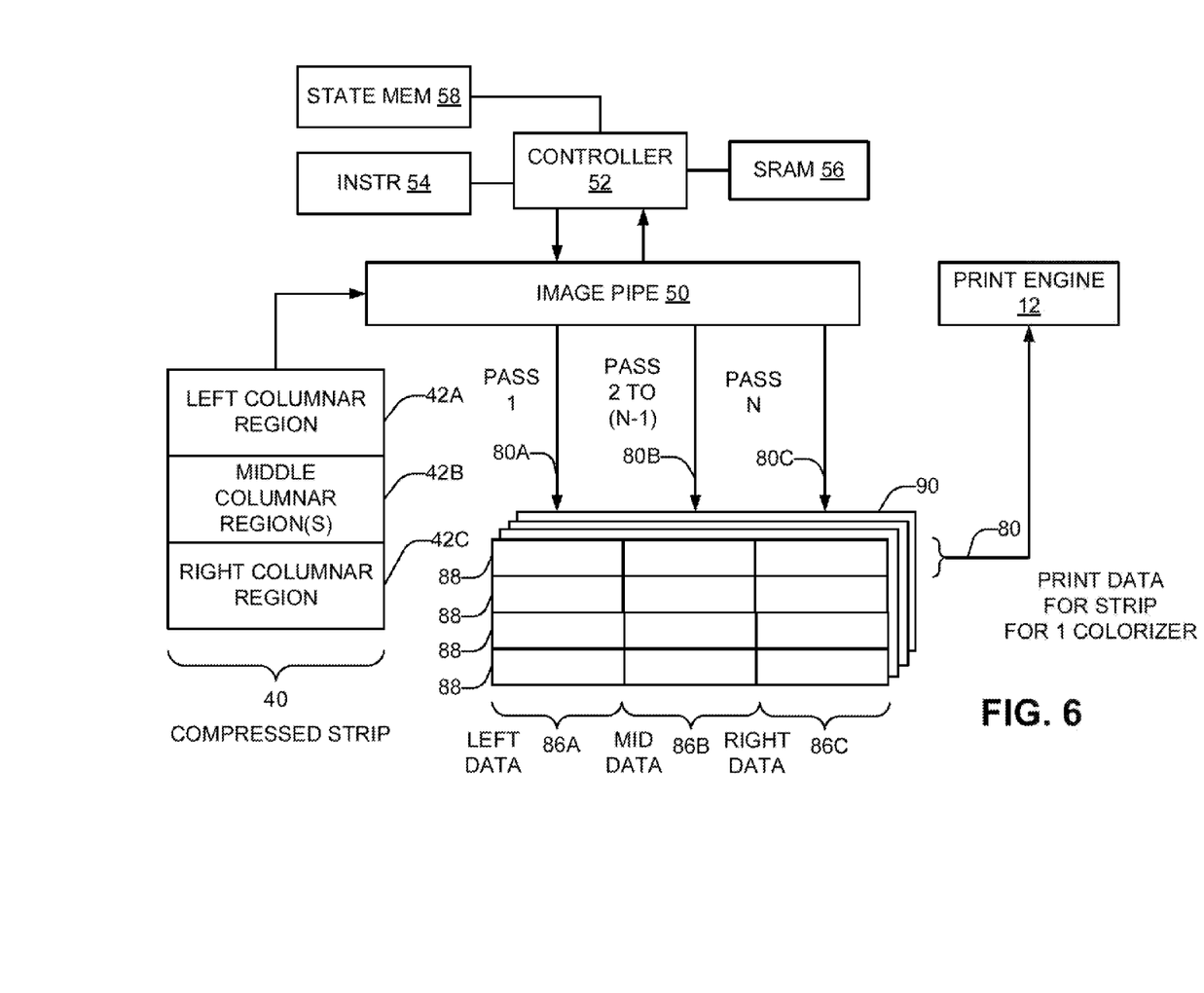
FIG. 6 is a schematic representation of the sequential processing of the columnar regions of a strip of image data through the image pipeline of FIG. 5 in accordance with an embodiment of the present disclosure.

Considering now in greater detail the print data buffer memory 90, and with reference to FIG. 6, the print data memory 90 is logically organized as one plane per colorizer 18 of print data 80 in row-and-column format. The image pipeline 50 stores the print data 80 generated for a particular colorizer 18 into the corresponding plane of the memory 90.

The memory 90 typically has a depth sufficient to store a number of strips 88 of the print data 80, where each strip 88 of print data corresponds to a strip 30 of image data 22. The buffer manager sub-stage 78 of the image pipeline 50 stitches the print data 80A-C generated for each columnar region 42 into locations in a corresponding column 86A-C of the proper plane of the memory 90. For example, the left columnar region 42A is processed by the image pipeline 50 in pass 1 to generate print data 80A which is stored in the memory locations of column 86A of a particular strip 88. Similarly, the middle columnar region(s) 42B are processed by the image pipeline 50 in passes 2 to (N−1) to generate print data 80B which is stored in the memory locations of column(s) 86B of the particular strip 88. The right columnar region 42C is processed by the image pipeline 50 in pass N to generate print data 80C which is stored in the memory locations of column 86C of the particular strip 88. In some examples, the size of the memory 90 can be optimized based on the speed and width of the print engine 12 in order to reduce or minimize the cost of the printer 10.

When all of the print data 80 for one particular strip 88 associated with a particular colorizer 18 has been generated and stored in the memory 90, it is available for consumption by the colorizer 18 of the print engine 12 to deposit the corresponding colorant 14 on the print medium 16.

Considering now in greater detail the processing of a compressed strip 40, and with continued reference to FIG. 6, the operations of the image pipeline 50 are orchestrated by a controller 52. The controller 52 may be a microcontroller implemented in an ASIC 100 that includes the image pipeline 50. The controller 52 is configured to execute at least one instruction stream stored in an instruction memory 54 accessible by the controller 52 to dynamically reprogram the pipeline 50 to serially process each of the columnar regions 42 of the selected strip. The instruction memory 54 may be located within the ASIC 100, or may be a component external to the ASIC 100 and communicatively coupled to the ASIC 100. The controller 52 also can access SRAM memory 56 in the ASIC 100. The SRAM memory 56 is typically used for storing intermediate data generated and used by the image pipeline 50. In some examples, the amount of SRAM memory 56 may correspond to a predetermined maximum width of a columnar region 42 that can be processed by the image pipeline 50.

The controller 52 dynamically reprograms the image pipeline 50 for each of the columnar regions 42 by loading into the pipeline 50 previously-saved state data associated with the columnar region 42 from a state memory 58 before the columnar region 42 is processed, and saving modified state data associated with the columnar region 42 in the state memory 58 after the print data 80 for the columnar region 42 is generated. The state memory 58 is typically external to the ASIC 100, but may alternatively be located within the ASIC 100. For a given strip 40, the state data loaded from the state memory 58 for a columnar region 42 typically includes data associated with one or more rows, adjacent to the given strip, of the columnar region for the previously-processed strip. This data is used by the print data generator 70 in the sliding window operations performed by the rows of the given strip that are adjacent to the previously-processed strip, in order to properly account for the effect on pixels, in these rows of the given strip, of neighboring pixels in the previously-processed strip. The state data may also include information about the state of the various sub-systems of the image pipeline 50 sufficient to properly enable processing of the particular columnar region 42 (i.e. left, middle, or right).

Figure 7:
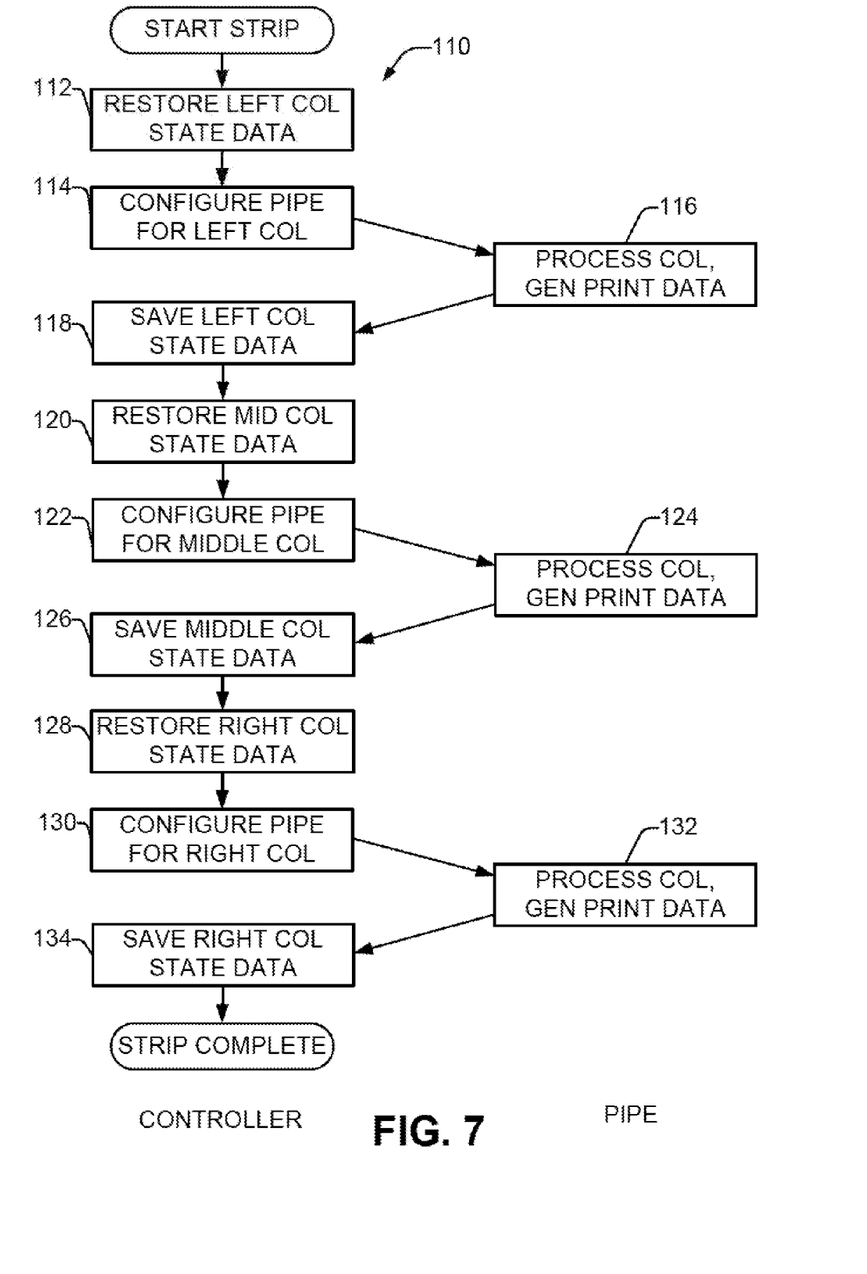
FIG. 7 is a schematic representation of an example instruction stream and its execution by a controller 52 of the printer of FIG. 1 in accordance with to an embodiment of the present disclosure.

Considering now the execution of an example instruction stream 110 by the controller 52, and with reference to FIG. 7, the instruction stream 110 is dependent on the number of columnar regions 42 that comprise a compressed strip 40. The example instruction stream 110 is configured to cause the controller 52 and image pipeline 50 to process three columnar regions 42—left 42A, one middle 42B, and right 42C—per compressed strip 40. At 112, the controller 52 restores the state data for the left columnar region 42A to the image pipeline 50 from the state memory 58. At 114, the image pipeline 50 is configured to process the left columnar region 42A. Configuring the image pipeline 50 typically includes setting up various control registers and tables of the image pipeline 50 and initializing the various image pipeline sub-stages for processing the region. Following configuration, the image pipeline 50 processes the columnar region 42A, generates print data 80A, and stores the print data 80A in the print data memory 90 at column 86A for the appropriate strip 88. The image pipeline processing is initiated by the controller 52 signaling the image pipeline 50 to process 116 the columnar region 42A. While the image pipeline 50 is processing the columnar region 42A to generate print data 80A, the controller 52 waits for a "region completed" signal from the image pipeline 50. In some examples, the controller 52 may perform administrative tasks while awaiting this signal from the image pipeline 50. For example, this may include evaluating at least one of an availability of the planes of the memory buffer 90 associated with the various colorizers 18 for receiving print data 80; a time that the various colorizers 18 have been waiting for print data 80; and a next strip to be processed for each of the colorizers 18.

After the print data 80A has been generated and stored, the image pipeline 50 sends the "region completed" signal to the controller 52, indicating that the processing of columnar region 42A has been completed. In response, the controller 52 saves, in the state memory 58, state data usable for processing the next left columnar region 42A.

The middle columnar region 42B is similarly processed by instructions 120, 122, and 126, and operation 124. The right columnar region 42C is also similarly processed by instructions 128, 130, and 134, and operation 132. After all the columnar regions 42 of a strip 40 have been processed and the corresponding print data 80 stored in memory 90, the controller 52 or the image pipeline 50 may send a "strip completed" signal to the print engine 12 to inform the engine 12 that a strip of print data 80 for a particular colorizer 18 is available to be printed. Then, the memory plane availability, colorizer wait time, and next strip identification may be utilized by the controller 52 to dynamically select the strip 40 and the colorizer 18 to be used for the next strip processing operation by the image pipeline 50. The sequence of strips 40 and colorizers 18 dynamically selected by the controller 52 collectively generates print data 80 for all of the colorizers 18 and for all of the strips 40 of the image data 22.

Considering now in greater detail the configuring of the image pipeline 50 to process a strip in N columnar regions 42, and with reference back to FIG. 1, the printer 10 includes a configurer 140. The configurer 140 programmatically configures the pipeline 50 to process a strip 40 in N columnar regions 42 by generating a corresponding instruction stream 110 and storing it in the instruction memory 54. As has been described heretofore, the image pipeline 50 processes columns 42 of a predetermined maximum width, in order to reduce the amount of memory and logic in an ASIC 100 for the image pipeline 50, and to allow a single ASIC 100 to be used in a variety of printers having a range of different media size and print resolution requirements. Where a strip 40 is wider than the maximum width of the image pipeline 50, the strip 40 is divided up into N columnar regions 42 for processing. The configurer 140 also configures and generates the instruction stream that is executed by the controller 52 which controls the mage pipeline 50.

The number N of columnar regions 42 into which a strip 40 is divided is determined based on the maximum width, a specified size of the print medium 16, and a specified print resolution at which the print data 80 is to be printed. The media size and/or the print resolution may be predetermined for a given printer 10; may be determined as part of the power-up sequence of the printer 10; or may be specified by the user. For example, the user may enter these parameters via a user interface of the printer. The printer 10 may have a keyboard and display (not shown) usable for this purpose, or other mechanisms. For example, the printer may determine the media size from an adjustment made by the user of media tray to fit the desired media in the printer. The number N of columnar regions 42 into which a strip 40 will be divided may be determined by dividing the number of individually printable elements (e.g. "dots") in a full-width row of the print data 80 by the predetermined maximum width of the image pipeline 50.

Once the number N has been ascertained, the configurer 140 can generate an instruction stream 110 corresponding to N, and store it in the instruction memory 54. The instruction memory 54 typically includes a different instruction stream 110 for each colorizer 18 For the most part, the different instruction streams 110 are similar, but for image quality reasons the image pipeline 50 may have some different control register and/or table settings associated with the different colorizers 18. If there are no differences between the instruction streams 110 associated with the different colorizers 18, a common instruction stream 110 can be used by controller 52. The controller 52 uses the appropriate instruction stream 110 corresponding to the particular colorizer 18 for which print data 80 for a strip 40 is being generated by the image pipeline 50.

In some examples, the configurer 140 includes a processor 142 coupled to a memory 144 which contains firmware instructions that, when executed by the processor 142, determines the media size and print resolution, calculates the number N of columnar regions per strip, generates the instruction stream 110, and stores the stream 110 in the instruction memory 54.

Figure 8:
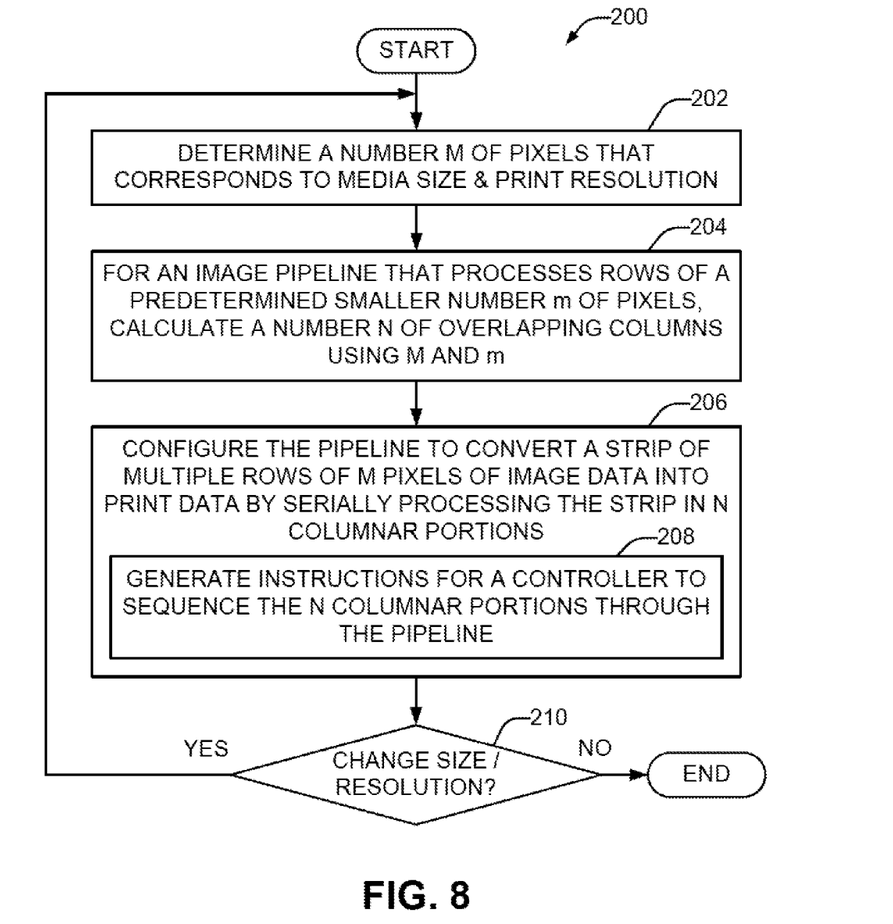
FIG. 8 is a flowchart in accordance with an embodiment of the present disclosure of a method of configuring a printer for a desired media size and print resolution.

Another example of the present disclosure, as best understood with reference to FIG. 8, is a method 200 of configuring a printer 10 for a desired media size and print resolution. In some scenarios, the flowchart of FIG. 8 may be considered as steps in a method implemented in the printer 10, such as by one or more of controller 52 and processor 142 executing instructions in instruction memory 54 and memory 144 respectively.

The method 200 begins, at 202, by determining a number M of pixels corresponding to the media size and the print resolution of a row of contone image data 22. At 204, for an image pipeline 50 of the printer 10 that is configured to process image rows of a predetermined smaller number m of pixels 34, a number N of overlapping columns 32 is calculated based on M and m. At 206, the image pipeline 50 is configured to convert a strip 30 of multiple rows of M pixels 34 of contone image data 22 into print data 80 corresponding to the strip 30. The image pipeline 50 converts the strip 30 by serially processing a compressed version 40 of the strip 30 in N columnar portions or regions 42. In some examples, the method 200 includes, at 208, generating instructions 110 for a controller 52 of the image pipeline 50. The instructions 110 sequence the N columnar portions 42 of the strip through the pipeline 50. In some examples, the method 200 includes, at 210, repeating the determining 202, calculating 204, and configuring 206 so as to reconfigure the image pipeline 50 to accommodate at least one of a different media size or a different print resolution set for the printer 10.

Figure 9A:
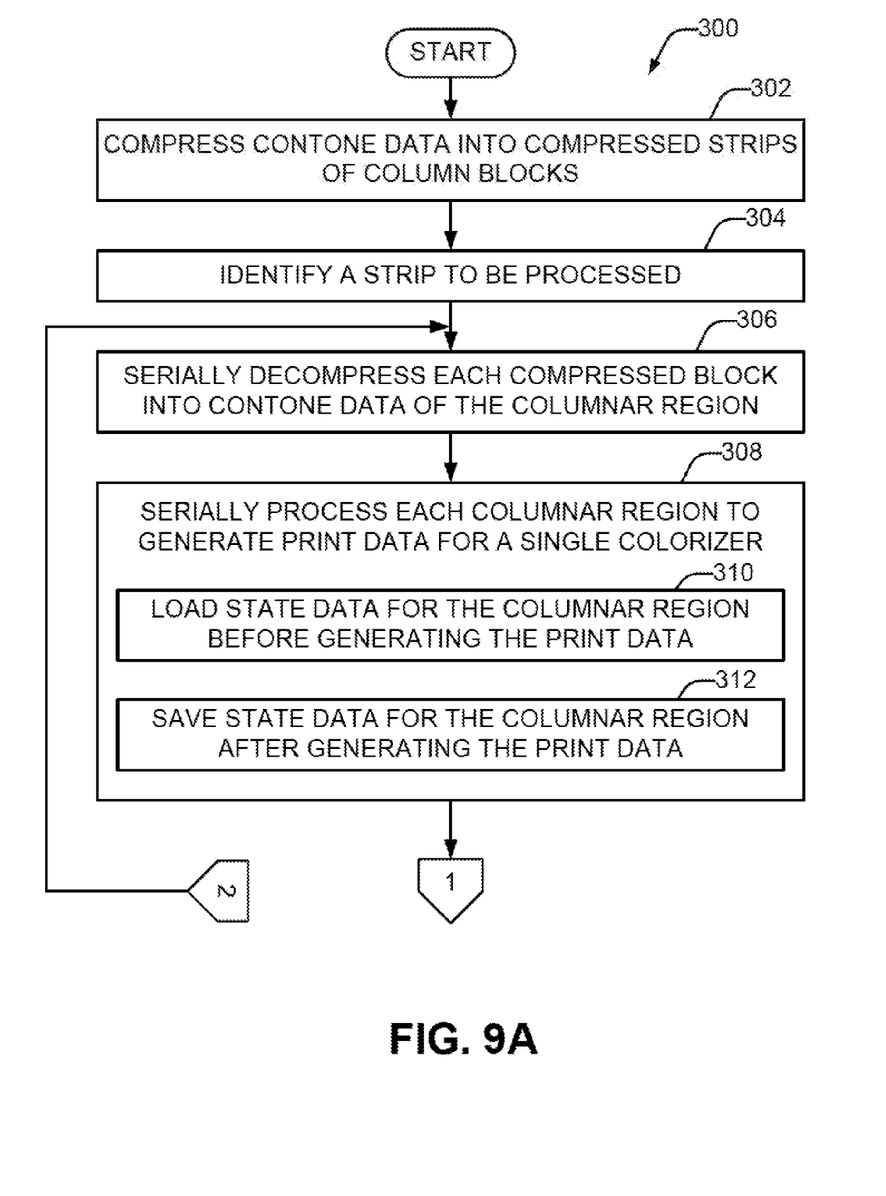
FIGS. 9A-B are flowcharts in accordance with an embodiment of the present disclosure of a method of printing, with a printer having at least one colorizer, contone data representing pixels of an image in a row-and-column format.
Figure 9B:
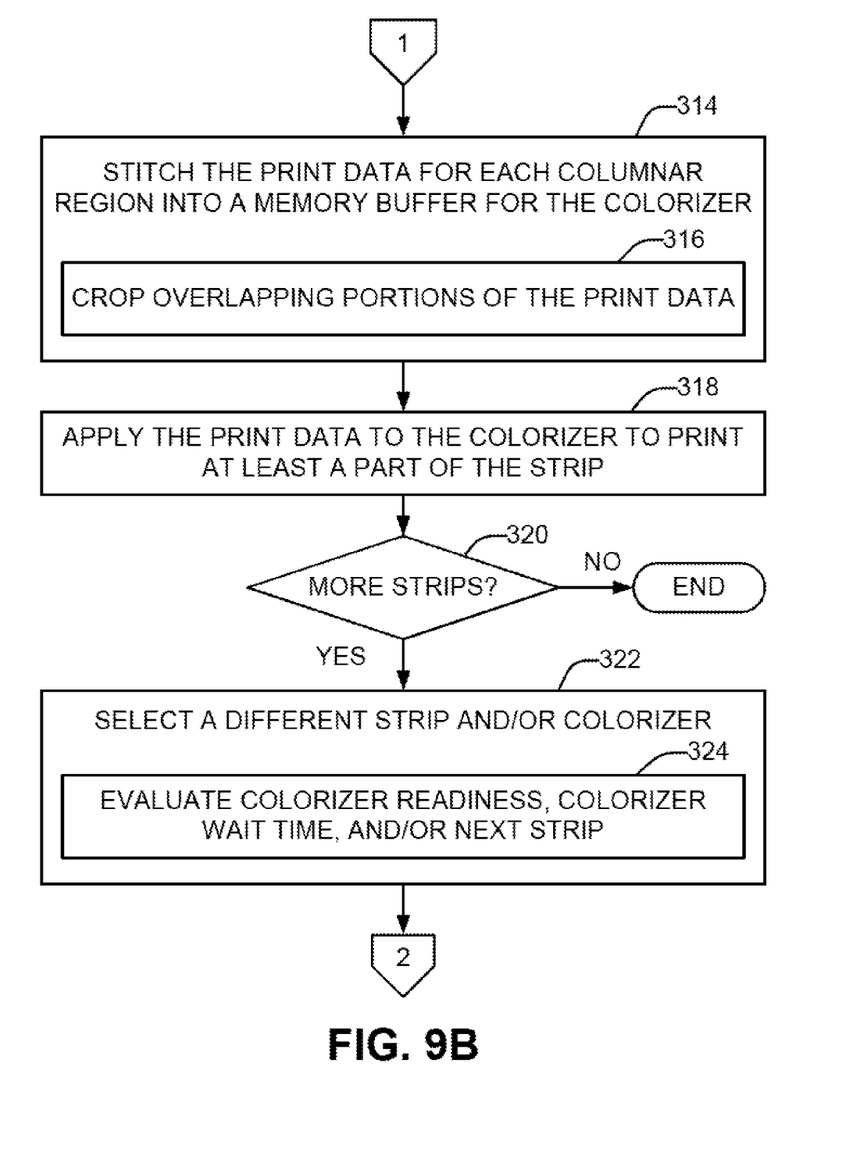

Yet another example of the present disclosure, as best understood with reference to FIG. 9, is a method 300 of printing, with a printer 10 having at least one colorizer 18, contone data 22 representing pixels 34 of an image in a row-and-column format. In some scenarios, the flowchart of FIG. 9 may be considered as steps in a method implemented in the printer 10, such as by one or more of controller 52 and processor 142 executing instructions in instruction memory 54 and memory 144 respectively.

The method 300 begins, at 302, by compressing the contone data 22 corresponding to overlapping multi-column columnar regions 32 of a multi-row strip 30 into a set of compressed column blocks 42 of a compressed strip 40. In some examples, the contone data for all of the strips of a page may be compressed before any strip is decompressed at 306. At 304, a strip of the contone data is identified. At 306, each of the compressed column blocks 42 corresponding to the identified strip is serially decompressed into the contone data 54 of the corresponding columnar region 32. At 308, the contone data 54 of each region 32 of the strip 30 is serially processed through an image pipeline 50 to generate print data 80 corresponding to the strip for a single one of the colorizers 18 by dynamically reprogramming the image pipeline 50 for the processing of each region 32. At 310, in some examples, state data associated with the columnar region 32 is loaded prior to generating the print data 80, and state data associated with the columnar region 32 is saved, at 312, after generating the print data 80. At 314, the print data 80 generated for the columnar region 32 of the single colorizer 18 is stitched into a corresponding columnar position 86 of a memory buffer 90 for the colorizer 18, where the memory buffer 90 is organized in the row-and-column format of the image data 22. At 316, the stitching includes cropping from the print data 80 a columnar portion 84 that overlaps an adjacent columnar region. At 318, after the print data 80 for all the columnar regions 32 of the strip has been placed into the memory buffer 90, at least a part of the strip is printed on a print medium 16 by applying the generated print data 80 from the memory buffer 90 to the colorizer 18 to deposit the colorant 14 on the print medium 16. If no more strips remain to be processed ("No" branch of 320), then the method 300 concludes. If more strips remain to be processed ("Yes" branch of 320), then at 322 at least one of a different multi-row strip or a different one of the colorizers 18 is selected, and processing is repeated by branching to 306. In some examples, this selecting includes, for at least one particular colorizer, evaluating at least one of an availability of the memory buffer 90 of the particular colorizer 18 for receiving print data 80, a time that the particular colorizer 18 has been waiting for print data 80, and a next multi-row strip to be processed for the particular colorizer 18.

From the foregoing it will be appreciated that the printer and methods provided by the present disclosure represent a significant advance in the art. Terms of orientation and relative position (such as "top," "bottom," "side", "left," "right," and the like) are not intended to require a particular orientation of any element or assembly, and are used for convenience of illustration and description. Although several specific examples have been described and illustrated, the disclosure is not limited to the specific methods, forms, or arrangements of parts so described and illustrated. For example, examples of the disclosure are not limited to one particular printing technology, but may include laser printers and inkjet printers, to name just a few. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application, Unless otherwise specified, steps of a method claim need not be performed in the order specified.

The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of printing, with a printer having at least one colorizer, contone data representing pixels of an image in a row-and-column format, comprising:

identifying a multi-row strip of the contone data, the strip divided into a plurality of overlapping multi-column columnar regions of the contone data: and serially processing the contone data of each region of the strip through an image pipeline to generate print data corresponding to the strip for a single on of the colorizers by dynamically reprogramming the image pipeline for each region.

2. The method of claim 1, comprising:

compressing the contone data corresponding to the columnar regions of ie strip into a set of compressed column blocks of a compressed strip; and serially decompressing each of the compressed column blocks of the compressed strip into the contone data of the corresponding columnar region prior to the serial processing of the corresponding columnar region.

3. The method of claim 2, wherein dynamically reprogramming the image. pipeline includes, for each columnar region:

loading state data associated with the columnar region prior to generating the print data; and saving state data associated with the columnar region after generating the print data.

4. The method of claim 2, comprising:

stitching the print data generated for the columnar region of the single colorizer into a corresponding columnar position of a memory buffer for the colorizer that is organized in the row-and-column format of the image.

5. The method of claim 1, wherein dynamically reprogramming the image pipeline includes, for each columnar region:

loading state data associated with the columnar region prior to generating the print data; and saving state data associated with the columnar region after generating the print data.

6. The method of claim 1, comprising:

stitching the print data generated for the columnar region of the single colorizer into a corresponding columnar position of a memory buffer for the colorizer that is organized in the row-and-column format of the image.

7. The method of claim 6, comprising:

after the print data for all the columnar regions has been placed into the memory buffer, printing at least a part of the strip on a print medium by applying the generated print data from the memory buffer to the colorizer.

8. The method of claim 6, wherein the stitching includes cropping from the print data a columnar portion that overlaps an adjacent columnar region.

9. The method of claim 1, comprising:

after the processing, selecting at least one of a different multi-row strip or a different one of the colorizers, and repeating the processing.

10. The method of claim 9, wherein the selecting includes, for at least one particular colorizer, evaluating at least one of an availability of a memory buffer of the particular colorizer for receiving print data, a time that the particular colorizer has been waiting for print data, and a next multi-row strip to be processed for the particular colorizer.

11. A method of configuring a printer for a desired media size and print resolution, comprising:

determining a number M of pixels corresponding to the media size and the print resolution of an image row;

for an image pipeline of the printer configured to process image rows of a predetermined smaller number in of pixels, calculating a number N of overlapping columns based on M and m; and configuring the image pipeline to convert a strip of multiple rows of M pixels of contone image data into print data corresponding to the strip by serially processing the strip in N columnar portions.

12. The method of claim 11, comprising
repeating the determining, calculating, and configuring to reconfigure the image pipeline to accommodate at least one of a different media size or a different print resolution.

13. The method of claim 12, wherein the configuring comprises:
generating instructions for a controller of the image pipeline to sequence the N columnar portions of the strip through the pipeline.

14. The method of claim 11, wherein the configuring comprises:
generating instructions for a controller of the image pipeline to sequence the N columnar portions of the strip through the pipeline.

15. A printer, comprising:
a print engine having at least one cololizer:
a compressor to convert contone image data in a row-and-column format into compressed multi-row strips, each strip divided into a plurality of overlapping multi-column columnar regions:
an image pipeline to process a columnar region of a selected one of the strips to generate print data corresponding to the columnar region of the selected strip for a selected one of the colorizets; and
a controller to dynamically reprogram the pipeline to serially process each of the columnar regions of the selected strip.

16. The printer of claim 15, wherein the controller dynamically reprograms the pipeline for each of the columnar regions by loading into the pipeline previously-saved state data associated with the columnar region from a state memory before the columnar region is processed, and saving modified state data associated with the columnar region in the state memory after the print data for the columnar region is generated.

17. The printer of claim 16, Wherein the pipeline processes columnar regions of a predetermined maximum width, and wherein the pipeline is programmatically configured, based on the maximum width, a specified media size, and a specified print resolution, to process the strip in N columnar regions.

18. The printer of claim 16, comprising:
a memory to buffer print data received from the pipeline fbr the selected strip and the selected colorizer: and
wherein the print engine is configured to print, using the selected colorizer, the buffered print data for the selected strip on a print medium after all of the columnar regions have been processed by the pipeline.

19. The printer of claim 15, wherein the pipeline processes columnar regions of a predetermined maximum width, and Wherein the pipeline is programmatically configured, based on the maximum width, a specified media size, and a specified print resolution, to process the strip in N columnar regions.

20. The printer of claim 15, comprising:
a memory to buffer print data received from the pipeline for the selected strip and the selected colorizer: and
wherein the print engine is configured to print, using the selected colorizer, the buffered print data for the selected strip on a print medium after all of the columnar regions have been processed by the pipeline.

* * * * *

UNITED STATES PATENT AND TRADEMARK OFFICE
CERTIFICATE OF CORRECTION

PATENT NO. : 9,171,239 B2
APPLICATION NO. : 14/126452
DATED : October 27, 2015
INVENTOR(S) : Prenn et al.

It is certified that error appears in the above-identified patent and that said Letters Patent is hereby corrected as shown below:

In the claims

Column 10, line 3, Claim 1, delete "data:" and insert -- data; --, therefor.

Column 10, line 6 approx., Claim 1, delete "on" and insert -- one --, therefor.

Column 10, line 12 approx., Claim 2, delete "ie" and insert -- the --, therefor.

Column 10, line 19 approx., Claim 3, delete "image." and insert -- image --, therefor.

Column 10, line 65, Claim 11, delete "in" and insert -- m --, therefor.

Column 11, line 22 approx., Claim 15, delete "cololizer:" and insert -- colorizer; --, therefor.

Column 11, line 26, Claim 15, delete "regions:" and insert -- regions; --, therefor.

Column 11, line 30, Claim 15, delete "colorizets;" and insert -- colorizers; --, therefor.

Column 12, line 28, Claim 20, delete "colorizer:" and insert -- colorizer; --, therefor.

Signed and Sealed this
Twenty-first Day of June, 2016

Michelle K. Lee
*Director of the United States Patent and Trademark Office*